May 5, 1964  J. BASSANO  3,131,653
PRODUCTION OF MACARONI AND THE LIKE
Filed Feb. 20, 1963
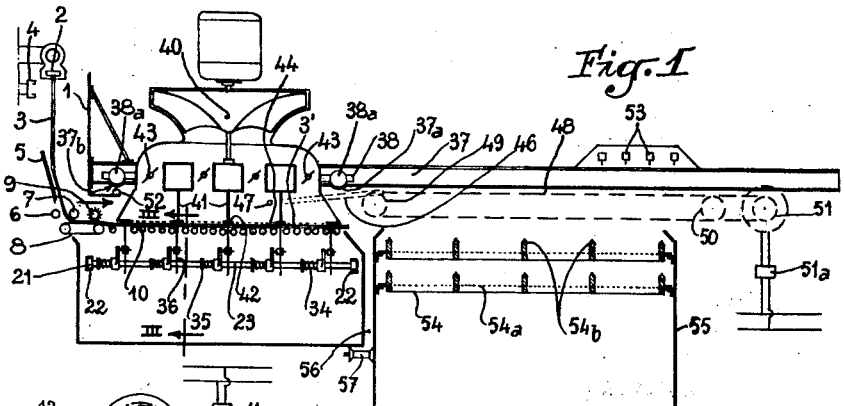
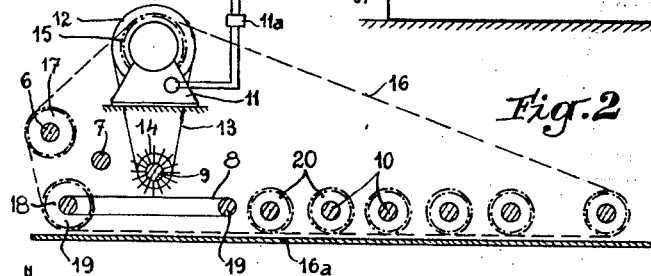
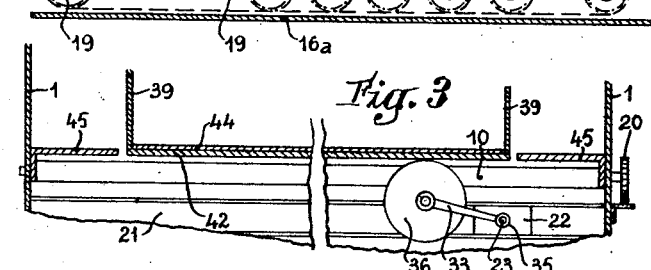
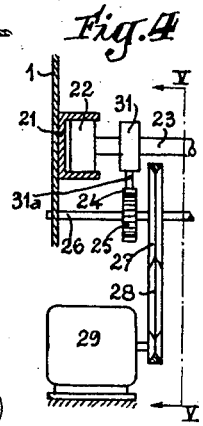
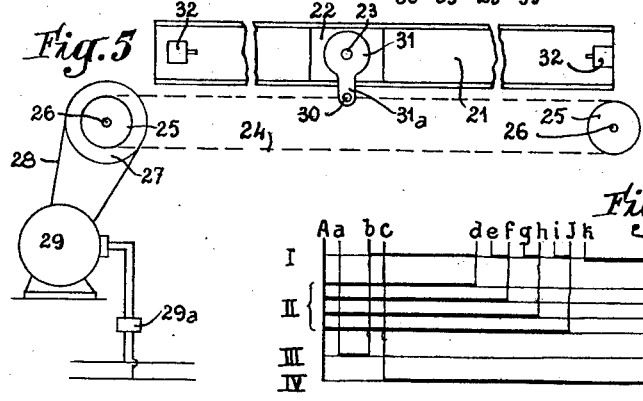
INVENTOR
Joseph Bassano
BY Alexander Dowell
ATTORNEYS United States Patent Office 3,131,653
Patented May 5, 1964

3,131,653
PRODUCTION OF MACARONI AND THE LIKE
Joseph Bassano, Saint Didier au Mont d'Or,
Rhone, France
Filed Feb. 20, 1963, Ser. No. 259,829
Claims priority, application France Mar. 5, 1962
14 Claims. (Cl. 107—4)

This invention relates to elongated products of Italian paste, such as macaroni, and it has for its object a method and an apparatus to cut such products into sections having the desired final length, and to deliver these sections onto perforated supports adapted to be introduced into a hot air drier without any additional handling operation.

Macaroni and like paste products are commonly obtained by extruding the paste through appropriate nozzles. The product issues from each extruding nozzle in the form of an endless soft flexible string or tube and it is generally desired to cut this endless product into sections having a predetermined length. These sections should besides be regularly disposed on appropriate perforated supports or screens before being introduced into the drying chamber within which they will be transformed into the hard dry product ready to be packed for transport and sale.

In accordance with the present invention the soft flexible strings or tubes from the extruding nozzles are collected in close parallel mutual relation on an appropriate conveying surface to form thereon a substantially regular layer in the vicinity of one side of a perforated surface, there is created on the other side of the said surface a negative pressure which applies and maintains this layer against the perforated surface, the layer thus firmly retained in position is cut transversely to the strings or tubes, as for instance by means of circular cutters rolling against the perforated surface or against intermediate rails provided thereon, the said perforated surface is brought above the drying supports or screens and the negative pressure is interrupted in order that the successive sections may fall by gravity onto the said supports.

The invention further includes an apparatus comprising substantially horizontal conveyor means, means to regularly dispose on the said conveyor means the soft endless strings or tubes issuing from the extruding nozzles to form thereon a substantially continuous layer, a suction chamber having a perforated wall disposed close to the said conveyor means, means to create a negative pressure within the said chamber to apply and maintain the said layer against the said perforated wall, means associated to the said perforated wall to cut the said layer transversely thereon into a number of successive sections of predetermined length, means to bring the suction chamber above perforated drying supports, and means to interrupt the said negative pressure to cause the said sections to fall onto the said perforated supports.

The conveyor means may comprise a first conveyor in the form of a relatively short endless band adapted to collect the endless strings of tubes issuing downwardly from the extruding nozzles, and a second conveyor comprising successive rollers. The suction chamber may be provided within a movable casing having a suction fan to create the negative pressure and appropriate valve means between the inlet of the said fan and the portion of the inner space of the said casing which forms the suction chamber above the perforated wall. As to the cutting means, they may comprise circular cutters carried by a carriage adapted to traverse the roller elements of the second conveyor, each cutter passing between two successive rollers thereof and being applied against the outer side of the perforated wall of the suction chamber.

In the annexed drawing:

FIG. 1 is a diagrammatical section of an apparatus according to this invention.

FIG. 2 is an enlarged sectional view illustrating the driving mechanism for the conveyors and associated parts.

FIG. 3 is a fragmental cross-section of the apparatus taken along line III—III (FIG. 1).

FIG. 4 is a fragmental transverse section illustrating the driving mechanism for the cutter supporting carriage.

FIG. 5 is a detail section taken along line V—V (FIG. 4).

FIG. 6 is a diagram illustrating the operation of the apparatus.

In the drawings the apparatus comprises a supporting frame 1 disposed close to the downwardly directed nozzles 2 of an extruding press of conventional design for the manufacture of macaroni or like paste products under endless form. Nozzles 2 produce a number of parallel soft flexible strings or tubes 3 disposed relatively close to each other and which pass downwardly in front of the outlet of a hot air conduit 4 adapted to realize a very slight superficial drying and hardening thereof. These strings or tubes 3 pass on an inclined guiding plate 5 and thence between a driven roller 6 and a loose roller 7, and they reach the horizontal upper run of an endless belt conveyor 8 on which they form a horizontal layer 3' which advances towards the right in FIG. 1 as indicated by the arrow and thus passes below a rotating brush 9 transversely disposed above conveyor 8 to brush and regularize the said layer. At the outlet end of the belt conveyor 8 this layer passes on a second horizontal conveyor made of successive rollers 10 (which will hereinafter be designated as conveyor 10).

As illustrated in FIG. 2, roller 6, belt conveyor 8, brush 9 and roller conveyor 10 are simultaneously driven by a motor 11. The shaft of this motor carries a pulley 12 which is connected by a belt 13 with a pulley 14 mounted on the shaft of brush 9. On the shaft of motor 11 is also keyed a sprocket 15 which drives a chain 16, the said chain passing successively on a sprocket 17 secured to one end of roller 6, on a sprocket 18 carried by the shaft of one of the end pulleys or drums 19 of the belt conveyor 8 and under a number of sprockets 20, each being secured to the shaft of one of the conveyor rollers 10. The straight-line portion of chain 16 situated under sprockets 20 is preferably slidably supported by a guiding rail 16a which maintains the chain in meshing engagement with the said sprockets. It will be appreciated that with such an arrangement chain 16 drives in synchronism roller 6 and conveyors 8 and 10. The respective diameters of sprockets 18, 20, of drums 19 and of rollers 10 are such that the speed of the endless belt of conveyor 8 is equal to the peripheral speed of the rollers 10 of the roller conveyor. As illustrated the circuit of motor 11 comprises a switch 11a and this switch is controlled by a general programming apparatus as explained below.

Below the above-described roller conveyor 10 are disposed two transverse rails 21 (FIGS. 1, 3, 4 and 5) which guide a movable carriage comprised of two blocks 22 rigidly connected with each other by a bar 23 which is disposed transversely with respect to rails 21, i.e. longitudinally with respect to the direction of movement of the layer supported by conveyor 10. As illustrated in FIG. 4 rails 21 are in the form of U-shaped irons opening inwardly and blocks 22 are arranged to slide in these rails or alternatively they may comprise rollers to roll therein. Carriage 22—23 is reciprocated by a chain 24 (FIGS. 4 and 5) supported by two end sprockets 25 carried by shafts 26 rotatably mounted on the frame. One of shafts 26 has a pulley 27 which is connected by a belt 28 with a drying motor 29. A point 30 of chain 24 is attached to the lower end of a depending arm 31a integral with a collar 31 rigidly mounted on bar 23. One of the guiding rails 21 supports two end switches 32 adapted to be actuated by the corresponding block 12 at the end of the respective strokes thereof. These switches control an electromagnetic reversing switch (not illustrated) which reverses rotation of motor 29. Further, in the circuit of the said motor is inserted a switch 29a which, as switch 11a (see FIG. 2), is under control of the general programming apparatus. Means (not illustrated) are also provided to insure that carriage 22—23 will only stop at the end of one of its strokes. This may be obtained by any conventional device, as for instance by the arrangement commonly used in windshield wipers for automotive vehicles, i.e. by providing an auxiliary circuit which by-passes the main controlling switch (here switch 29a) in order that the motor may continue rotating after the said main switch is opened, this auxiliary circuit being automatically interrupted at each stroke end, as for instance by additional contacts of end switches 32.

In this manner a relatively short current pulse delivered by switch 29a results in carriage 22—23 effecting a single full stroke.

On the transverse bar 23 are rotatably mounted a number of appropriately spaced arms 33 (FIGS. 1 and 3) which are urged upwardly by torsion springs 34 attached to rings 35 secured onto bar 23. Each arm rotatably carries a circular knife 36. As clearly shown in FIG. 1 the arrangement of cutters 36 and of rollers 10 is such that each cutter passes between two successive rollers.

The frame 1 further comprises two horizontal rails 37 which extend longitudinally with respect to the conveyors and to the layer 3' which they support. Rails 37 support the rollers 38a of a movable carriage 38 on which is mounted an open-ended vertical casing 39 having a rectangular horizontal cross-section. In the upper end of this casing is disposed a suction fan 40 which draws air through the lower end thereof. The inner space of casing 39 situated below fan 40 is divided by transverse partitions 41 into a number of vertical passages, namely four in the construction illustrated. The lower edges of partitions 41 and of the transverse walls of casing 39 are provided with flat rails 42. The width of casing 39, i.e. its horizontal dimension transversely to the conveyors and to layer 3', is substantially equal to the width of the conveyors and the distance between the median axes of rails 42 is equal to the length desired for the final products. Each passage between the successive partitions 41, or between same and the end walls of casing 39, is provided at its upper end with a butterfly valve 43 actuated by electromagnetic means not illustrated. Each passage further comprises at its lower end a perforated surface 44, as for instance a grid or a coarse fabric made of an appropriate plastic material. Frame 1 supports on each side of the lower end of casing 39 a plate 45 (FIG. 3) which extends longitudinally to form a bearing surface for the circular cutters 36 at the end of their transverse stroke, as this will be more fully explained later.

Carriage 38 and casing 39 are given a to and fro movement along rails 37 by means of a connecting rod 46 (FIG. 1) having its ends pivotally attached respectively to casing 39 and to a chain 48 supported by two end sprockets 49 and 50, the latter being driven by an electric motor 51 in the circuit of which is inserted a switch 51a, itself under control of the general programming apparatus, as already explained in the case of switches 11a and 29a. At one end of the stroke of carriage 38 (left-hand end in FIG. 1) casing 39 is just above roller conveyor 10, its lower rails 42 being in position to form bearing surfaces for cutters 36, as clearly shown in FIG. 1. Rollers 38a are then located in depressions 37a, 37b of rails 37 and casing 39 is thus slightly lowered in such a manner that its perforated surfaces 44 are at a quite small distance from layer 3'. The bottom of one of depressions 37b is provided with a micro-switch 52 adapted to control the electromagnetic means which actuate valves 43 and to re-set the programming apparatus, as explained below. The arrangement is such that when micro-switch 52 is actuated, it causes valves 43 to open simultaneously and to remain at the open position, until they are successively closed by a number of successive micro-switches 53 provided in the vicinity of the other end of rails 37, as this will be more fully explained. This operation of valves 43 may be obtained in any appropriate manner, as for instance by providing each with two separate electro-magnets insuring respectively the opening and the closing movement, frictional means maintaining the valve at either position. At the other end of the stroke of carriage 38, casing 39 is situated above one of a number of perforated drying supports or screens 54. These screens 54 are adapted to receive the paste products and to convey same through a hot air drier. They are carried for this purpose by two lateral endless chains supported by lateral frame members 55, this arrangement forming no part of the present invention. Each screen comprises a perforated surface 54a the upper side of which is divided by partitions 54b into a number of compartments extending transversely with respect to the movement of carriage 38, each having a width somewhat greater than the length of the products to be received.

Between frame 1 and the adjacent frame member 55 there is provided a passage 56 and below the lower end of passage 56 is disposed an endless belt conveyor 57.

The general operation will be explained with reference to the programming diagram of FIG. 6. In this figure line I corresponds to the displacements of casing 39, the heavy black portion above line I corresponding to movement towards the right in FIG. 1 and the heavy black portion below line I to the movement in the reverse direction. Lines II correspond to valves 43, each being open during the time represented by the heavy black portion. Line III indicates the transverse movement of cutters 36 in one and the other direction, as in the case of line I. Line IV corresponds to the rotation of motor 11, i.e. to the operating time of roller 6, brush 14 and conveyors 8 and 10.

At the beginning of an operating cycle (point A) casing 39 has just come to a standstill above roller conveyor 10, with rollers 38a of carriage 38 resting on the bottom of depressions 37a and 37b. Motor 11 is at rest and therefore conveyor and layer 3' are also at standstill. Cutters 36 are at one end of their to and fro strokes.

Actuation of micro-switch 52 by the corresponding roller 38a has caused opening of valves 43 and the air draft of fan 40 has acted on layer 3' which is therefore applied against the perforated surfaces 44.

After a short time, at point a the programming apparatus closes switch 29a for a quite short while to start motor 29. Cutters 36 therefore effect a single stroke transversely of the machine, i.e. across layer 3', the paste strings or tubes being thus cut against rails 42. As above explained motor 29 causes cutters 26 to effect a full single stroke, i.e. to pass from a lateral plate 45 to the other, see FIG. 3.

When this stroke of cutters 26 is terminated (point b) the programming apparatus closes switch 51a to start motor 51. Casing 39 therefore moves towards the right in FIG. 1 with the layer 3' still applied against the lower perforated surfaces 44, but in the form of separate sections.

At point c, shortly after casing 39 begins its stroke, the programming apparatus closes switch 11a to start motor 11. The paste strings or tubes which issue continuously from nozzles 2 and which had formed loops between roller 6 and the inlet end of belt conveyor 8 during the relatively short period of rest of motor 11 are again taken by the said conveyor to form thereon the substantially regular layer 3' which is progressively advanced towards the right by roller conveyor 10.

At point *d* the first micro-switch 53 (these micro-switches being considered from left to right) is actuated by an appropriate part of casing 39, as for instance by a lateral cam surface. This actuation of the first micro-switch 53 opens the first valve 43 (these valves being also considered from left to right) and at the same time causes a short stoppage of motor 51, i.e. of casing 39, as for instance by means of a delayed relay. Owing to the closing of the first valve 43, the first section of layer 3', i.e. the section which was retained against the perforated surface 44 corresponding to the said first valve 43, is liberated and falls on the first compartment of screen 54 (the successive sections being here again considered from left to right). At point *e* casing 39 is re-started to be again stopped for a short time at *f* by the second micro-switch 53 which closes the second valve 43 whereby the second section of layer 3' is dropped onto the second compartment of screen 54, and so on (points *g*, *h*, *i*, *j*).

At point *k* motor 51 is again started, but the right-hand end of connecting rod 46 has reached sprocket 50 and thus passes from the upper run of chain 48 to the lower run thereof. The movement of carriage 38 and of casing 39 is therefore reversed, i.e. it takes place towards the left. Simultaneously micro-switches 53 are rendered ineffective (as for instance by providing on connecting rod 46 the cam surfaces adapted to actuate micro-switches 53 in order that the said surfaces be at a lower level during the return stroke of carriage 38), in such a manner that casing 39 effects an uninterrupted return stroke towards the left. It will be observed that all valves 43 are now closed.

At point *l*, somewhat before casing 39 reaches the end of its stroke towards the left, the programming apparatus stops motor 11 to bring conveyors 8 and 10 to a standstill together with layer 3'.

At the end of the return stroke of carriage 38 and of casing 39 one of rollers 38*a* actuates micro-switch 52. This has for its result first to open valves 43, as already explained, and further to re-set the programming apparatus for a new operating cycle.

Of course the extruding rate through nozzles 2 is so adjusted that the length extruded during each operating cycle corresponds exactly to the advance of conveyors 8 and 10. It will further be obvious that means could be provided to detect any possible difference and to adjust the extruding press accordingly. Again the advance of layer 3' by conveyors 8 and 10 is somewhat in excess of the length of casing 39 so as to be sure that the last section of layer 3' will always have the desired length. The small length of layer 3' situated beyond the last cutter 26 falls on conveyor 57 and is returned to the machines which prepare the paste to be extruded.

I claim:

1. A method for the production of tubular or plain string-like products of Italian paste which consists in extruding the paste in the form of endless strings; in forming a regular layer of said strings; in disposing a perforated surface close to said layer; in creating on the side of said perforated surface opposed to said layer a negative pressure to cause said layer to become firmly applied against said perforated surface; in cutting said layer on said perforated surface substantially transversely to said strings into a number of successive sections; in displacing said perforated surface to bring said sections above collecting supports; and in interrupting said negative pressure to drop said sections onto said collecting supports.

2. In a method as claimed in claim 1, the step of slightly pre-drying said extruded strings before forming a regular layer therewith.

3. A method for the manufacture of tubular or plain string-like Italian paste products, such as macaroni and the like, which consists in continuously extruding the paste in the form of substantially parallel endless strings; in slightly pre-drying said strings; in collecting said pre-dried strings on a movable support in the form of a substantially regular layer; in disposing a perforated surface close to said layer; in creating on the side of said perforated surface opposed to said layer a negative pressure to cause said layer to become firmly applied against said perforated surface; in cutting said layer on said perforated surface substantially transversely to said strings into a number of successive sections; in displacing said perforated surface to bring said sectons above collecting supports; and in interrupting said negative pressure to drop said sections onto said collecting supports.

4. In a method as claimed in claim 3, the step of stopping said movable support before creating said negative pressure.

5. A machine for automatically cutting and handling Italian paste products extruded in the form of tubular or plain endless strings, comprising means to collect said strings in the form of a substantially regular and horizontal layer; means to regularly advance said layer horizontally; a perforated transporting surface to form a cutting table for said layer, said surface having a lower side and an upper side; means to bring said perforated surface substantially horizontally above said layer with its lower side at a small distance therefrom; means associated with said perforated surface to create a negative pressure on the upper side thereof to cause said layer to become firmly applied against the lower side of said perforated surface; means to cut said layer against the lower side of said perforated surface into a number of successive sections substantially transversely to said layer; means to bring said perforated surface with said sections applied against the lower side thereof above collecting supports; and means to interrupt said negative pressure to cause said sections to fall onto said supports.

6. In a machine as claimed in claim 5, means to slightly pre-dry said strings before collecting same in the form of a substantially regular and horizontal layer.

7. A machine for automatically cutting and handling Italian past products extruded from substantially downwardly directed nozzles in the form of substantially parallel tubular or plain endless strings, comprising means to slightly pre-dry said strings below said nozzles; a substantially horizontal endless belt conveyor to receive said pre dried strings in substantially parallel mutual relation to form a continuous layer thereon; means to guide said pre-dried strings toward said endless belt conveyor; means to regularize the layer formed by said strings on said endless belt conveyor; a substantially horizontal roller conveyor disposed substantially in line with said endless belt conveyor to receive said layer therefrom, said roller conveyor comprising a succession of substantially parallel rotating rollers; means to drive said endless belt conveyor and said roller conveyor in unison so that both advance said layer at the same linear speed; a movable suction chamber to act on said layer to raise same from said roller conveyor by pneumatic action, said chamber having a perforated lower wall with an upper side and a lower side; means to bring said suction chamber above said roller conveyor with the lower side of said perforated lower wall disposed substantially horizontally at a small distance from said layer; means associated with said suction chamber to create a negative pressure therein so as to raise said layer from said roller conveyor and to firmly maintain same applied against the lower side of said perforated lower wall by pneumatic action; a plurality of circular cutters transversely movable between successive rollers of said roller conveyor to roll against the lower side of the perforated lower wall of said suction chamber to cut said layer into a number of succcessive sections; resilient means to apply said circular cutters against the lower side of the perforated lower wall of said suction chamber; means to drive said circular cutters in unison to cause same to effect a single stroke across the lower side of said perforated lower wall; means to bring said suction chamber with said sections applied against the lower side of the lower perforated wall thereof above collecting supports; and means to interrupt said negative pressure within said suction chamber to cause said sections to fall onto said collecting supports.

8. In a machine as claimed in claim 7, rails on the lower side of the perforated lower wall of said suction chamber to form rolling tracks for said circular cutters.

9. In a machine as claimed in claim 7, said means to create a negative pressure within said suction chamber comprising a continuously rotating exhaust fan and said means to interrupt said negative pressure within said suction chamber being formed of valve means interposed between said fan and said suction chamber.

10. In a machine as claimed in claim 7, substantially vertical transverse partitions within said suction chamber to divide same into a number of passages, each partition having its lower edge situated substantially in the vertical plane of the path of one of said circular cutters across the lower side of the perforated lower wall of said suction chamber; said means to create a negative pressure within said suction chamber being formed of a continuously rotating exhaust fan having its inlet in communication with said passages; and said means to interrupt said negative pressure comprising valves each disposed in one of said passages.

11. In a machine as claimed in claim 7, said means to regularize said layer on said endless belt conveyor comprising a rotating brush transversely disposed above said endless belt conveyor to act on the pre-dried strings forming said layer.

12. In a machine as claimed in claim 7, said means to regularize said layer on said endless belt conveyor comprising a rotating brush transversely disposed above said endless belt conveyor to act on the pre-dried strings forming said layer, and said rotating brush being driven by the driving means of said endless belt conveyor and of said roller conveyor.

13. In a machine as claimed in claim 7, each of said circular cutters being rotatably carried by a supporting arm, said supporting arms being mounted at spaced intervals on a common bar, and said bar forming part of a movable carriage reciprocable transversely of said roller conveyor.

14. In a machine as claimed in claim 7, substantially horizontal stationary surfaces on each side of said roller conveyor to form bearing surfaces for said circular cutters at the end of each stroke thereof.

References Cited in the file of this patent

UNITED STATES PATENTS 2,800,088   Leibundgut _____ July 23, 1957